M. L. ROGERS.
CONCENTRATOR.
APPLICATION FILED NOV. 23, 1917.
1,343,683.
Patented June 15, 1920.
4 SHEETS—SHEET 1.
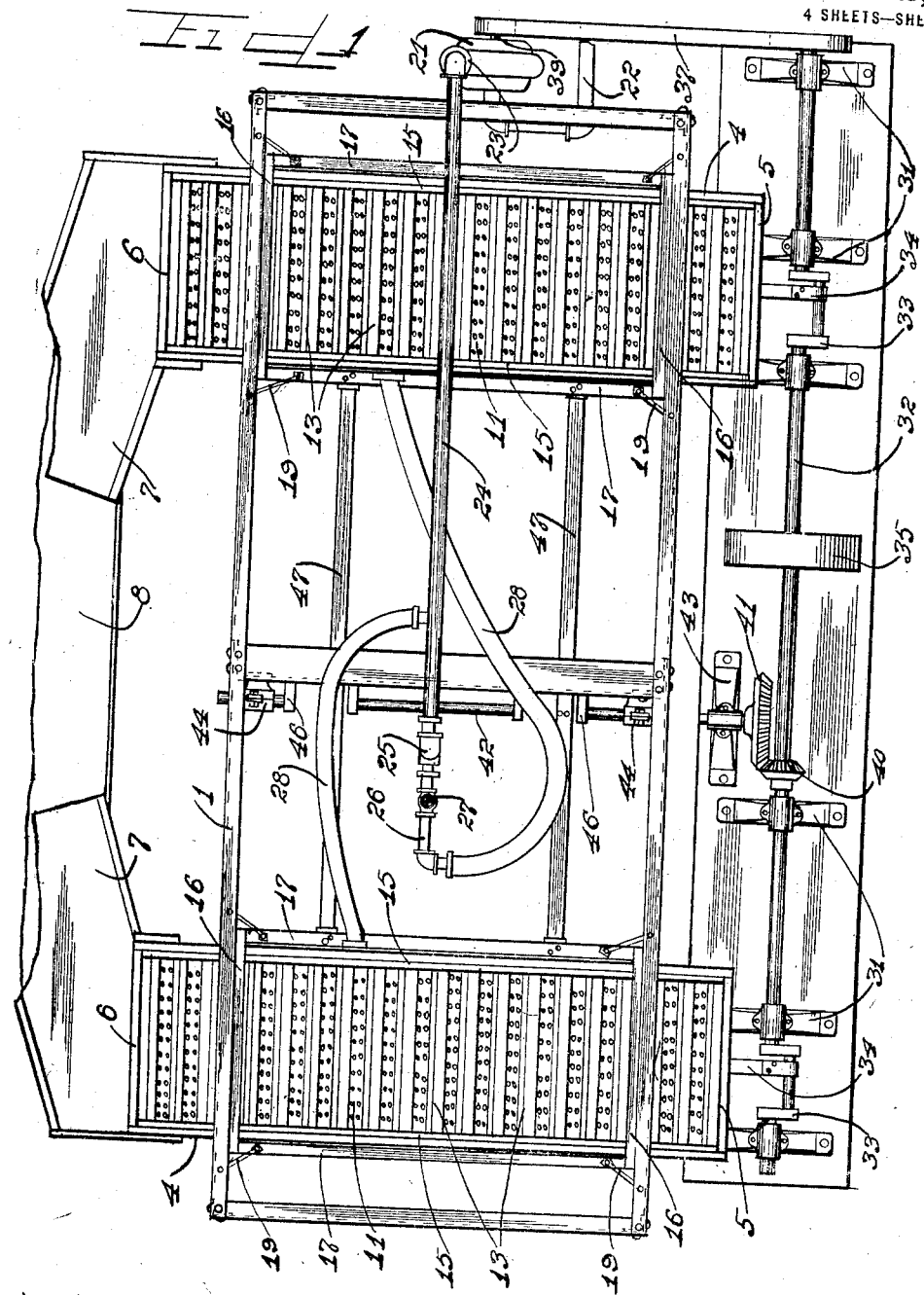

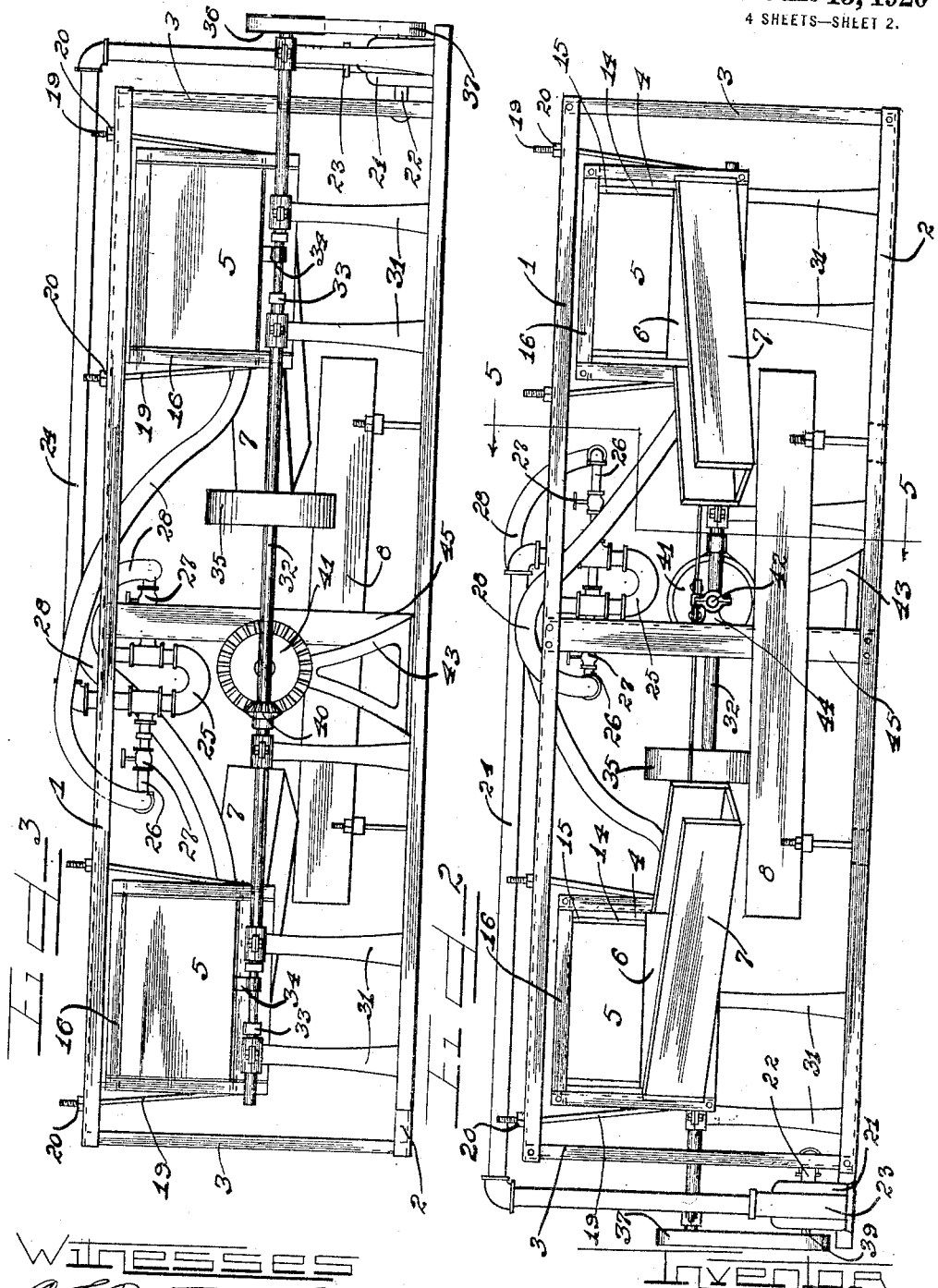

M. L. ROGERS.
CONCENTRATOR.
APPLICATION FILED NOV. 23, 1917.
1,343,683.
Patented June 15, 1920.
4 SHEETS—SHEET 3.
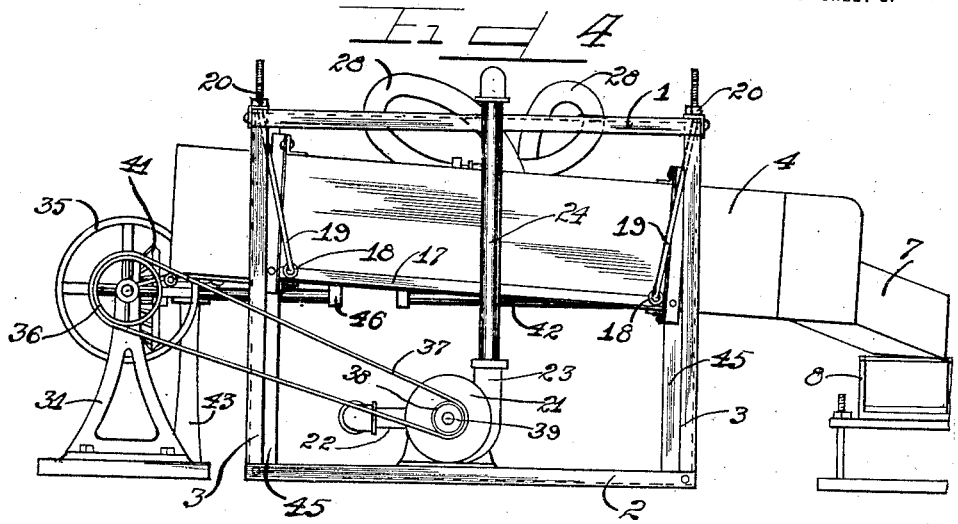
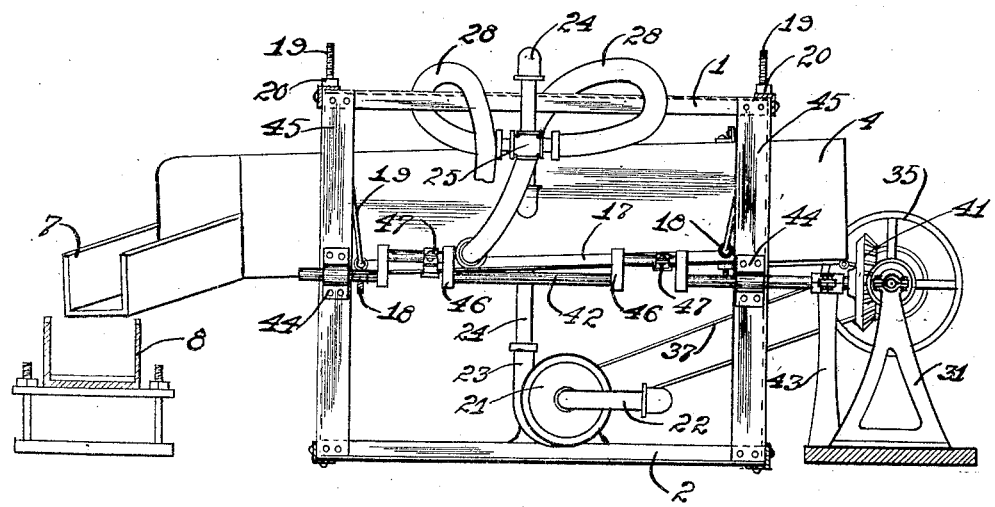
Witnesses
C. F. Peterson.
Charles W. Hills Jr.
Inventor
Manuel L. Rogers.
by Charles W. Hills Atty.

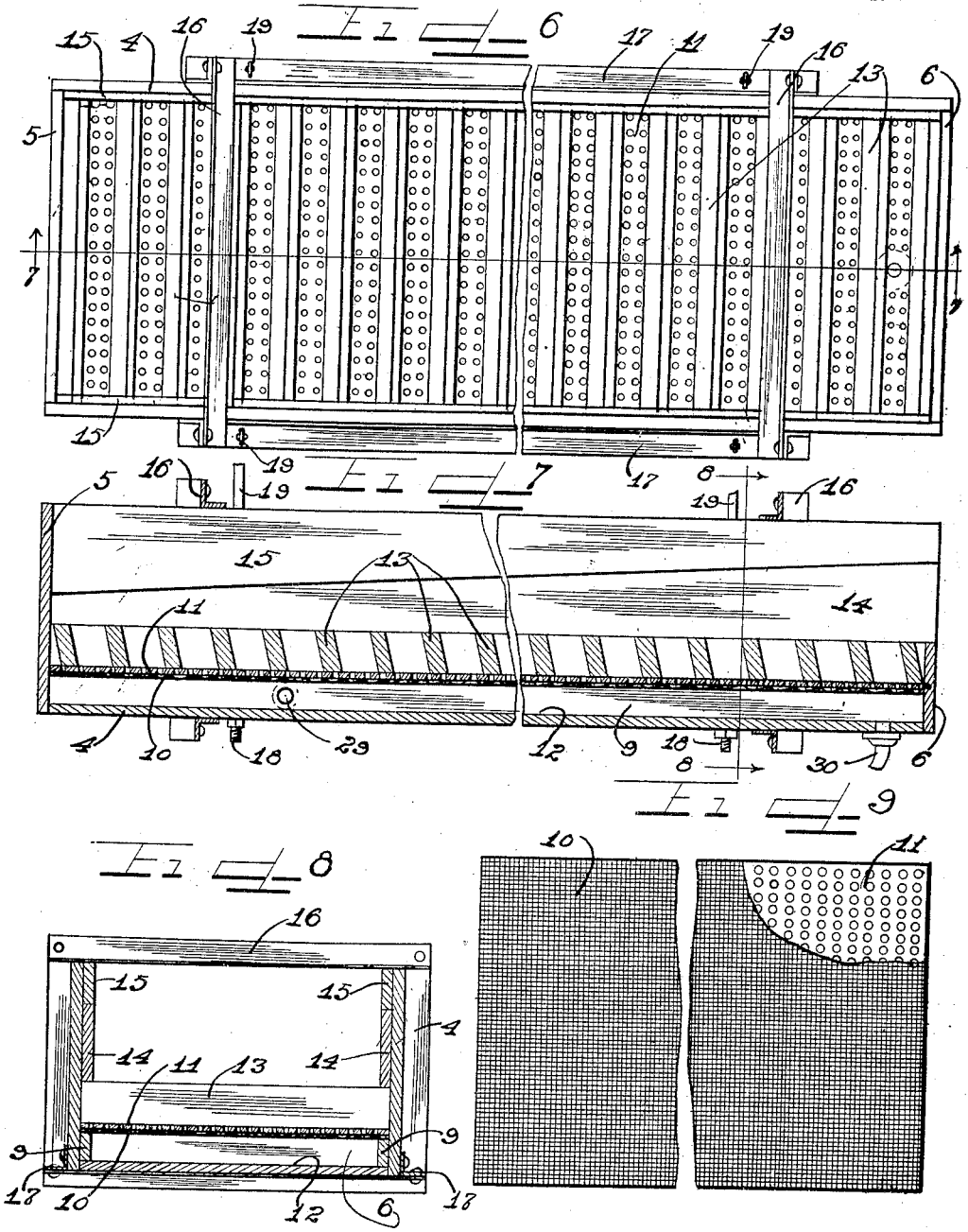

UNITED STATES PATENT OFFICE.

MANUEL L. ROGERS, OF JOHANNESBURG, CALIFORNIA.

CONCENTRATOR.

1,343,683.  Specification of Letters Patent.  Patented June 15, 1920.

Application filed November 23, 1917. Serial No. 203,503.

*To all whom it may concern:*

Be it known that I, MANUEL L. ROGERS, a citizen of the United States, and a resident of the city of Johannesburg, in the county of Kern and State of California, have invented certain new and useful Improvements in Concentrators; and I do hereby declare that the following is a full, clear, and exact description of the same, reference being had to the accompanying drawings, and to the numerals of reference marked thereon, which form a part of this specification.

This invention relates to an improved form of a water operated concentrator wherein the riffle troughs are subjected to longitudinal and lateral shifting movements and wherein the riffle spaces are prevented from packing by means of pulsations derived from water under pressure, thus affording a means for the finding or recovering of tungsten, gold, or other values from comminuted ores, tailings, or from auriferous slimes by separating the values from the worthless gangue by virtue of the difference in the specific gravities.

It is an object of this invention to construct a concentrator wherein pulsations caused by water under pressure act upon materials disposed in movably mounted riffles to permit recovery of values from said materials.

It is also an object of this invention to construct a water operated concentrator provided with riffles which are mounted to permit the same to be longitudinally and laterally shifted, whereby tailings or other similar materials disposed in said riffles for treatment are adapted to be separated according to the specific gravity of the particles to permit separation of the values from the gangue.

It is a further object of this invention to provide an improved form of concentrator embracing movably mounted riffles adapted to be subjected to a side and an end shake whereby comminuted ores, tailings, or other similar materials carried in said riffles are separated according to the specific gravity of the particles to permit the recovery of values, and wherein said materials are prevented from packing in said riffles by pulsations caused by water under pressure which moves through the materials during the shaking operations.

It is an important object of this invention to provide an improved form of concentrator wherein the riffles are subjected to longitudinal and lateral shaking movements and simultaneously flooded with water under pressure to prevent packing of the riffles during the separating process by which values are separated from the gangue contained in ores, tailings, or slimes which are being treated in the concentrator.

Other and further important objects of this invention will be apparent from the disclosures in the drawings and specification.

The invention (in a preferred form) is illustrated in the drawings, and hereinafter more fully described.

On the drawings:

Figure 1 is a top plan view of a concentrator embodying the principles of this invention, showing parts partly broken away.

Fig. 2 is a front elevation thereof.

Fig. 3 is a rear elevational view of the concentrator.

Fig. 4 is a left end elevational view of the device with respect to Fig. 2.

Fig. 5 is a sectional view taken on line 5—5, of Fig. 2.

Fig. 6 is top plan detail view of one of the concentrator riffles.

Fig. 7 is a section taken on line 7—7, of Fig. 6.

Fig. 8 is a section taken on line 8—8, of Fig. 7.

Fig. 9 is a detail bottom plan view of the screen partly broken away to show the perforated plate associated therewith.

As shown on the drawings:

The supporting framework of the device comprises an upper frame 1, and a lower frame 2, rigidly connected to one another by means of uprights 3. Said framework may be constructed of wood, angle irons, or of any other suitable material desired. Disposed laterally across each end of the supporting framework between the upper and lower frames 1 and 2, and normally parallel to one another are inclined riffles each comprising a trough, channel or sluice 4, closed at the rear end by a back board 5, and at the front end provided with a front board or dash 6, which rests on the bottom of the trough and extends upwardly for about one third of the height of the trough, thus leaving the upper portion of the front end of the trough open. Rigidly secured upon the front end of each of the troughs 4, is the inner end of an outlet or discharge channel 7, the sides of which are of a height practically the same as that of the front board 6. Each of the discharge channels 7, is open at the front end and is inclined downwardly and inwardly toward one another to permit the same to discharge into a common conveyer, runway or sluice 8, disposed laterally across the front of the concentrator below the open ends of said discharge channels 7, as clearly shown in Figs. 2 and 5. The runway 8, may of course be of any desired length to permit the material discharged therein to be conducted or carried away to a suitable place of deposit.

Rigidly secured longitudinally to the inner surface of each of the side walls of each of the riffle troughs 4, and seated against the bottoms of said troughs, is a supporting strip 9, the height of which is about half that of the front board 6. Mounted upon the upper edges of the supporting strips 9, in each trough 4, is a metal screen 10, upon which rests a perforated metal plate 11. Said screen and plate contact the sides and ends of the troughs and are of the same size and afford a partition below which a water pressure chamber or compartment 12, is formed. Disposed laterally across each of the troughs 4, parallel to and spaced from one another are a plurality of rearwardly inclined riffle-bars or riffle slats 13, which rest or seat upon the perforated plates 11, and are removably held secured in position by means of movable wedges 14, one of which is disposed to the inside and adjacent to each of the side walls of the trough. Said wedges 14, extend rearwardly for the entire length of the troughs and engage under side strips or stationary wedge boards 15, which are rigidly secured to the sides of the troughs along the upper margins thereof, thus affording a ready means for securing the riffle-bars 13, in position, as shown in Fig. 7.

Secured around each of the riffle troughs 4, are a pair of reinforcing frames 16, made of angle irons or other suitable material, and rigidly connected to one another by means of connecting bars or angle irons 17, one of which is disposed on each side of the trough adjacent the lower edge thereof. Secured in each end of each of the connecting bars 17, is an eye bolt 18, to each of which is connected the lower end of a hanger or suspension rod 19, the upper end of which is threaded and extends upwardly through one of the longer members of the top frame 1. An adjusting nut 20 is threaded upon the upper threaded end of each of the suspension rods 19, above the frame 1, thus affording a suitable means for adjustably supporting the riffles suspended in the supporting frame of the device, with the front rods 19, longer than the rear rods to permit the riffle troughs to slant downwardly toward the runway 8. By turning the adjusting nuts 20, on the rods 19, it will be seen that the riffle troughs may be raised or lowered as desired.

Mounted at one side of the concentrator or in any other desired place is a centrifugal pump 21, connected with a water supply main 22. The pump 21, has connected to the outlet pipe 23, thereof, a feed pipe 24, which is directed upwardly and inwardly to a point about in the center of the concentrator frame, and has the inner end thereof securely connected with a pipe union or pipe connector 25, to which is secured two auxiliary feed pipes 26, each of which is provided with a controlling valve 27. Connected to each of the auxiliary feed pipes 26, is one end of a flexible pipe or hose 28, the other end of which is connected in a suitable inlet opening 29, provided for the purpose in the inner side of the trough and communicating with the interior of the water pressure chamber 12, near the rear end thereof. Connected through a suitable opening in the bottom of each of the troughs 4, and near the front end thereof is an outlet pipe 30.

Rotatably journaled in suitable standards 31, arranged across the rear of the concentrator or in any other suitable position is a main driving shaft 32, having an eccentric or double crank 33, connected therein, one of which is disposed directly to the rear of each of the riffles, as clearly shown in Fig. 1. A connecting rod or shaker arm 34, is connected to each of the cranks 33, and to the respective rear ends of the riffle troughs 4, whereby a longitudinal shaking movement may be imparted to the riffles, when the shaft 32, is rotated. Secured on the driving shaft 32, between the ends thereof is a main drive wheel or pulley 35, over which a belt is adapted to be engaged to connect the shaft to any suitable source of driving power such as a motor or gas engine. Mounted on the end of the shaft 32, which is disposed to the rear of the pump 21, is an auxiliary wheel or pulley 36, over which a belt 37, is engaged. The belt 37, is also engaged around a small wheel or pulley 38, which is keyed or otherwise secured upon the axle 39, of the pump 21, thereby affording a suitable means for driving the pump from the shaft 32, to permit water under pressure to be forced into the chambers 12, of the riffles.

Mounted upon the shaft 32, is a bevel pinion 40, which meshes with a bevel gear 41, secured on the rear end of a second shaft 42, disposed at right angles to the shaft 32, and rotatably journaled in a standard 43, and in suitable bearing brackets 44, secured to uprights 45, which form a part of the supporting frame of the concentrator. The shaft 42, is provided with eccentrics or double cranks 46, to each of which is connected a connecting rod or shaker arm 47, one end of each of which is attached to one of the riffle troughs and the other end to the opposite riffle trough, thereby affording suitable connections to permit a lateral shifting or shaking movement to be imparted to the riffles simultaneously with the longitudinal shaking movement when the shafts 32 and 42, are rotated.

The operation is as follows:

With the parts assembled to form an improved type of concentrator as described the separating, finding or the recovery of values, such as tungsten and gold, from comminuted ores, tailings or slimes is readily accomplished. To conduct a run on any of the above classes of materials, the concentrator is set in operation by connecting the large pulley wheel 35, with a suitable source of power whereby the shaft 32, is rotated, which transmits the drive to the shaft 42, and through the pulley belt 37, to the axle 39, of the water pump 21, thus operating the pump which forces water derived from the water supply main 22, through the pump and into the water chambers 12, of the riffles under pressure. The controlling valves 27, of course may be adjusted to regulate the flow into the riffle chambers 12, or either one or both may be closed independently of one another as desired. With the valve 27 open, the water forced into the chambers 12, forces its way up through the screens 10, and apertured plates 11, between the riffle-bars 13, and flows out of the front ends of the riffle troughs 4, over the front boards 6, and is then conducted by way of the discharge channels 7, into the runway 8. It will of course be noted that while the water is being pumped into the riffles, that the shafts 32 and 42, are also being rotated thereby actuating the respective shaker arms 34 and 47, thus simultaneously imparting a longitudinal and lateral shaking movement to the adjustably mounted riffles.

The material to be treated is fed into the riffle troughs from above and near the rear end thereof, from any suitable type of hopper or by other suitable means, the forward and side shaking movements of the inclined riffles tends to distribute the material and of course thoroughly shakes the same so that it gradually sorts itself into layers according to the specific gravity of the particles comprising the material. During the shaking process of the comminuted material the water under pressure entering the chambers 12, acts under pulsations and flows upwardly through the screens 10 and apertured plates 11, up through the material simultaneously with the shaking thereof, thereby preventing the riffles from becoming packed and also facilitating the sorting of the material particles to separate the values from the waste or gangue.

The specific gravity of the values contained in the material being greater than that of the gangue, the tungsten or gold atoms gradually fall between the riffle bars onto the apertured plates 11, and finally disappear through the perforations in the plates 11, and screens 10, and are concentrated in the water pressure chambers 12, the outlets 30, of which may be closed by any suitable means if desired during the operation. The force of the water flowing upwardly through the screens and plates flows over the riffle bars 13, out of the front open ends of the troughs 4, carrying the waste or gangue, which has a specific gravity less than that of the values, therewith through the outlet channels 7, and into the runway 8, to be carried to any desired place of deposit.

The values thus being concentrated in the chambers 12, due to the combined longitudinal and lateral shifting or shaking movements of the adjustably mounted riffles, together with the pulsations caused by the flow of the water under pressure passing upwardly through the materials being treated, may of course be removed from the riffle chambers 12, after the concentrator has been stopped, by simply removing the retaining wedges 14, thus permitting removal of the riffle bars 13, the plates 11, and the screws 10, to afford access to the values which have been concentrated and are ready for removal and separation if necessary. The important feature of the operation of the concentrator is the fact that the pulsations caused by the upward flow of the water under pressure prevents the riffle from becoming packed, thereby permitting a continuous operation of the concentrator for the recovery or concentration of the values contained in the material being treated.

I am aware that various details of construction may be varied through a wide range without departing from the principles of this invention, and I therefore do not purpose limiting the patent granted otherwise than necessitated by the prior art.

I claim as my invention:

1. In a concentrator of the class described, a framework, and a riffle adjustably supported thereby comprising a trough, a screen and a perforated plate disposed one above the other mounted in said trough parallel to the base thereof to afford a chamber in said trough below said screen, inclined riffle-bars seated on said plate, and wedge means disposed above said riffle bars for holding said screen, plate and riffle-bars removably secured in position within said trough.

2. In a concentrator of the class described, a framework, and a riffle adjustably supported thereby embracing a trough, a screen and a perforated plate disposed therein to afford a chamber therebelow, water inlet and outlet means communicating with said chamber, inclined riffle slats on said plate, and means engaged on said riffle slats for removably holding said slats, screen and plate in position within said trough.

3. A concentrator for the treatment of mineral materials, embracing a riffle trough, a screen therein spaced from the bottom of said trough to afford a chamber therebelow, a perforated plate disposed flatly on said screen, rearwardly inclined riffle slats thereon spaced in parallel relation to one another, wedge means above said riffle slats and extending through the entire length of the trough for removably holding said screen, plate and slats in position within said trough, and mechanisms connected with said riffle trough adapted to simultaneously force water under pressure into said chamber and upwardly through said screen and plate, and means connected with said trough adapted to cause a shaking movement of said trough to permit the concentration of values in said chamber and the discharge of the gangue from the trough, said values and gangue forming the materials being treated by the concentrator.

4. In a concentrator for the recovery of values from comminuted ores, tailings, slimes and the like, an adjustably mounted riffle, a plurality of crank shafts connected with said riffle, a screen, a perforated plate and inclined riffle slats mounted in said riffle one above the other, a pump connected with one of said shafts and with said riffle, and means for simultaneously rotating said shafts and operating said pump, to impart a longitudinal and a lateral shifting movement to said riffle and at the same time force water under pressure from said pump through said screen, plate and between said inclined slats mounted in said riffle.

5. A concentrator comprising an inclined screen, riffles mounted thereon transversely to the direction of inclination of the screen, means for passing water upwardly through the screen, means for reciprocating the screen in said direction, and means for reciprocating the screen in a direction parallel to the riffles at a lower speed than the first reciprocating means.

In testimony whereof I have hereunto subscribed my name in the presence of two subscribing witnesses.

MANUEL L. ROGERS

Witnesses:
F. C. HOXIE,
T. J. C. WEBSTER.